US012781854B2

(12) United States Patent
Yang et al.

(10) Patent No.: US 12,781,854 B2
(45) Date of Patent: Nov. 3, 2026

(54) O-RING VACUUM SEALING STRUCTURE AND VACUUM APPARATUS

(71) Applicant: ARRAYED MATERIALS (CHINA) CO., LTD., Shenzhen (CN)

(72) Inventors: Hong Sheng Yang, Shenzhen (CN); Xiaojun Zhang, Shenzhen (CN)

(73) Assignee: ARRAYED MATERIALS (CHINA) CO., LTD., Shenzhen (CN)

( * ) Notice: Subject to any disclaimer, the term of this patent is extended or adjusted under 35 U.S.C. 154(b) by 155 days.

(21) Appl. No.: 18/729,908

(22) PCT Filed: Feb. 25, 2022

(86) PCT No.: PCT/CN2022/077949
§ 371 (c)(1),
(2) Date: Feb. 25, 2025

(87) PCT Pub. No.: WO2023/137826
PCT Pub. Date: Jul. 27, 2023

(65) Prior Publication Data

US 2025/0198514 A1 Jun. 19, 2025

(30) Foreign Application Priority Data

Jan. 19, 2022 (CN) ........................ 202210084277.1

(51) Int. Cl.
*F16J 15/06* (2006.01)

(52) U.S. Cl.
CPC .................................. *F16J 15/061* (2013.01)

(58) Field of Classification Search
CPC ................................ F16J 15/061; F16J 15/06
See application file for complete search history.

(56) References Cited

U.S. PATENT DOCUMENTS 1,311,159 A * 7/1919 Freer ...................... F16J 15/061
277/637
3,746,348 A * 7/1973 Stone ..................... F16J 15/106
277/609
6,158,744 A * 12/2000 Jones ..................... F16J 15/164
277/459
10,047,883 B2 * 8/2018 Mammen ............ F16L 19/0218
(Continued)

FOREIGN PATENT DOCUMENTS

CN 2613647 Y 4/2004
CN 107664219 A 2/2018
(Continued)

*Primary Examiner* — Eugene G Byrd
(74) *Attorney, Agent, or Firm* — The Webb Law Firm

(57) ABSTRACT

Disclosed are an O-ring vacuum sealing structure, and a vacuum apparatus that includes the O-ring vacuum sealing structure. The O-ring vacuum sealing structure includes O-ring vacuum sealing structure, including a vacuum sealing assembly, and an O-ring; wherein, the vacuum sealing assembly has an O-ring groove; the O-ring is arranged within the O-ring groove; and the O-ring vacuum sealing structure further includes an O-ring retainer housing, and an O-ring retainer; the O-ring retainer housing is formed within the vacuum sealing assembly and is on either side of the O-ring groove; the O-ring retainer is removably arranged within the O-ring retainer housing and abuts against the O-ring.

17 Claims, 6 Drawing Sheets

(56) References Cited

U.S. PATENT DOCUMENTS

| | | | | |
|---|---|---|---|---|
| 2004/0017049 | A1* | 1/2004 | Fink | F16J 15/004 277/627 |
| 2004/0036233 | A1* | 2/2004 | Schleth | F16J 15/061 277/641 |
| 2006/0208430 | A1* | 9/2006 | Malz | F16J 15/061 277/637 |
| 2016/0319937 | A1* | 11/2016 | Stirnemann | F16J 15/3284 |
| 2017/0299094 | A1* | 10/2017 | Hoevel | F16J 15/061 |
| 2020/0116279 | A1* | 4/2020 | Galbreath | F16B 35/042 |
| 2020/0141494 | A1* | 5/2020 | Sakaguchi | H05K 7/20272 |
| 2020/0173560 | A1* | 6/2020 | Henmi | F16J 15/002 |
| 2020/0219737 | A1* | 7/2020 | Seo | F16J 15/061 |
| 2020/0309266 | A1* | 10/2020 | Groweg | E21B 33/10 |
| 2021/0170386 | A1* | 6/2021 | Burgess | B01J 37/0215 |
| 2022/0221057 | A1* | 7/2022 | Mckay | F16J 15/0887 |

FOREIGN PATENT DOCUMENTS

| | | | | | |
|---|---|---|---|---|---|
| CN | 108085476 | A | | 5/2018 | |
| CN | 214197227 | U | | 9/2021 | |
| CN | 114060515 | A | | 2/2022 | |
| CN | 217081392 | U | | 7/2022 | |
| JP | 08285085 | A | * | 4/1996 | |
| JP | 2002357290 | A | | 12/2002 | |
| JP | 2002372152 | A | * | 12/2002 | F16J 15/061 |
| JP | 2006153169 | A | | 6/2006 | |
| JP | 2008303931 | A | | 12/2008 | |
| JP | 2009144735 | A | | 7/2009 | |
| JP | 4918417 | B2 | * | 4/2012 | |
| JP | 2012102790 | A | * | 5/2012 | F02M 35/10354 |
| JP | 4969736 | B2 | * | 7/2012 | |
| JP | 4985973 | B2 | * | 7/2012 | |
| JP | 2014074441 | A | * | 4/2014 | F16J 15/106 |
| JP | 2020118239 | A | * | 8/2020 | F16K 37/0041 |

* cited by examiner

O-RING VACUUM SEALING STRUCTURE AND VACUUM APPARATUS

CROSS-REFERENCE TO RELATED APPLICATIONS

This application is the United States national phase of International Patent Application No. PCT/CN2022/077949 filed Feb. 25, 2022, and claims priority to Chinese Patent Application No. 202210084277.1 filed Jan. 19, 2022, the disclosures of which are hereby incorporated by reference in their entireties.

BACKGROUND

Technical Field

The present disclosure relates to the field of vacuum sealing, and more specifically to an O-ring vacuum sealing structure, and a vacuum apparatus.

TECHNICAL CONSIDERATIONS

An O-ring is a circular cross-section ring molded from elastomeric material. Generally, an O-ring is installed in a gland or O-ring groove when used. The O-ring groove, e.g., a dovetail groove or a square groove, usually cuts into metal or another rigid material, contains and supports the O-ring. The combination of these two elements, O-ring and gland, constitute the classic O-ring seal assembly. The O-ring, when mechanically squeezed, experiences compression-caused elastic deformation and makes contacts with the sealing surface under compressive stress, such that proper sealing is achieved. An O-ring is widely used in high vacuum apparatus.

In the existing O-ring vacuum seal technology, a venting slot is provided on the O-ring groove in order to facilitate the removal of the O-ring and the outgassing of the trapped air in the O-ring groove during vacuum pumping. As shown in FIG. 1, the venting slot is positioned the side of the O-ring groove where the O-ring is installed. However, when the O-ring is mechanically squeezed, the section of the O-ring adjacent to the venting slot can freely expand laterally. That is, the compression-caused elastic deformation of a section of the O-ring corresponding to the venting slot is smaller than that of other sections directly abutting the O-ring groove. As a result, the required squeeze or rate of compression (about 16%) of the O-ring cannot be reached. The insufficient rate of compression of the O-ring will have an adverse impact on the sealing effect.

Therefore, the existing O-ring vacuum seal technology needs to be improved and further developed.

SUMMARY

In non-limiting embodiments or aspects, provided are an O-ring vacuum sealing structure and a vacuum apparatus. An O-ring retainer housing is provided on an O-ring groove of a vacuum sealing assembly, and an O-ring retainer is provided in the O-ring retainer housing, such that the integrity of the O-ring groove is ensured. The O-ring groove confines the side walls of the O-ring. As a result, the predetermined squeeze or rate of compression can be achieved when the O-ring is squeezed/pressed, and better sealing can be achieved. In addition, a special O-ring pick tool is not necessary during the removal of the O-ring, which avoids the scratching of the O-ring and the sealing surface of the O-ring groove by the O-ring pick tool and ensures the proper sealing effect when the O-ring is reused.

According to one non-limiting aspect of the present disclosure, an O-ring vacuum sealing structure is provided. The O-ring vacuum sealing structure includes an vacuum sealing assembly and an O-ring. The vacuum sealing assembly has an O-ring groove. The O-ring is fitted within the O-ring groove. The O-ring vacuum sealing structure further includes an O-ring retainer housing and an O-ring retainer. The O-ring retainer housing is formed within the vacuum sealing assembly and positioned on either side of the O-ring groove. The O-ring retainer is removably installed within the O-ring retainer housing and abuts the O-ring when the O-ring is compressed.

According to the O-ring vacuum sealing structure provided in non-limiting embodiments of the present disclosure, an O-ring retainer housing is provided on the vacuum sealing assembly, and an O-ring retainer is provided in the O-ring retainer housing, such that the integrity of the O-ring groove is ensured. The O-ring groove confines the side walls and the bottom of the O-ring. As a result, the predetermined rate of compression can be achieved when the O-ring is squeezed/pressed, and better sealing can be achieved. In addition, a special O-ring pick tool is not necessary during the removal of the O-ring, which avoids scratching of the O-ring and the sealing surface of the O-ring groove by the O-ring pick tool and ensures the proper sealing effect when the O-ring is reused.

Further, the O-ring retainer defines a through hole through which a fastener passes to connect with the vacuum sealing assembly.

According to a non-limiting embodiment of the present disclosure, a through hole is formed in the O-ring retainer, so that a fastener can pass through to integrally connect the O-ring retainer and the vacuum sealing assembly. The O-ring is confined and fixed, such that the preset rate of compression is achieved when the O-ring is squeezed and deformed, and better sealing is realized.

Further, the fastener is provided as a captive vented screw. The fastener is flare-mounted on the O-ring retainer. The captive screw used is a specialised fastener designed with a built-in feature, i.e., a standard thread along with a reduced diameter, that prevents it from completely disengaging or becoming fully separated from the O-ring retainer.

According to a non-limiting embodiment of the present disclosure, the fastener, i.e., a captive vented screw, fixes the O-ring retainer to vacuum sealing assembly, such that after the fastener is loosened and the fastener is screwed out of the threaded hole of the vacuum sealing assembly during the removal of the O-ring, the fastener remains connected with the O-ring retainer. As a result, the fastener is prevented from accidentally falling into the vacuum system during the removal of the O-ring retainer and the O-ring, and such accident would otherwise have an adverse impact on the vacuum system.

Further, the through hole is provided as a counter bore, and the head of the fastener is positioned within the countersunk head part of the counter bore.

Further, the fastener, or captive vented screw, has a venting hole along the axial direction of the fastener.

Further, the O-ring retainer is provided with a venting path which joins the O-ring groove.

Further, the joint at which the top surface of the O-ring retainer and the first side surface of the O-ring retainer meet, is a chamfered and curved surface.

Further, the first side surface discussed above abuts against the O-ring, and the first side surface is an arc surface.

Further, the height of the inside or the vacuum side of the O-ring groove is smaller than that of the outside of the O-ring groove.

According to another non-limiting embodiment or aspect of the present disclosure, a vacuum apparatus is provided. The apparatus includes the O-ring vacuum sealing structure as discussed above.

In specific applications, the O-ring vacuum sealing structure is not only convenient for sealing two joining surfaces of the vacuum apparatus and providing a sealed environment for the vacuum chamber of a vacuum apparatus to avoid air leakage, but also convenient for the installation and removal of the O-ring, with no additional special tools needed during the removal of the O-ring. As a result, the scratching of the O-ring and the sealing surface of the O-ring groove is avoided, and the adverse impact on sealing effect by the scratching of the O-ring and the sealing surface of the O-ring groove can be avoided.

Thus, according to the O-ring vacuum sealing structure and the vacuum apparatus provided in non-limiting embodiments of the present disclosure, an O-ring retainer housing is provided on the vacuum sealing assembly, and an O-ring retainer is provided in the O-ring retainer housing, such that the integrity of the O-ring groove is ensured. The O-ring groove confines the side walls of the O-ring. As a result, the predetermined rate of compression can be achieved when the O-ring is squeezed/pressed, and better sealing can be achieved. Meanwhile, a special tool is not necessary during the removal of the O-ring. The scratching of the sealing surface of vacuum sealing assembly or O-ring is avoided. The sealing effect is ensured when the O-ring is reused.

Other features and advantages of the present disclosure will be illustrated in the following description, and will be apparent in part from the description, or may be understood by practicing the present disclosure. The objectives and other advantages of the present disclosure can be better understood by the features of various embodiments particularly set forth in the description, claims and drawings.

DETAILED DESCRIPTION

Figure 1:
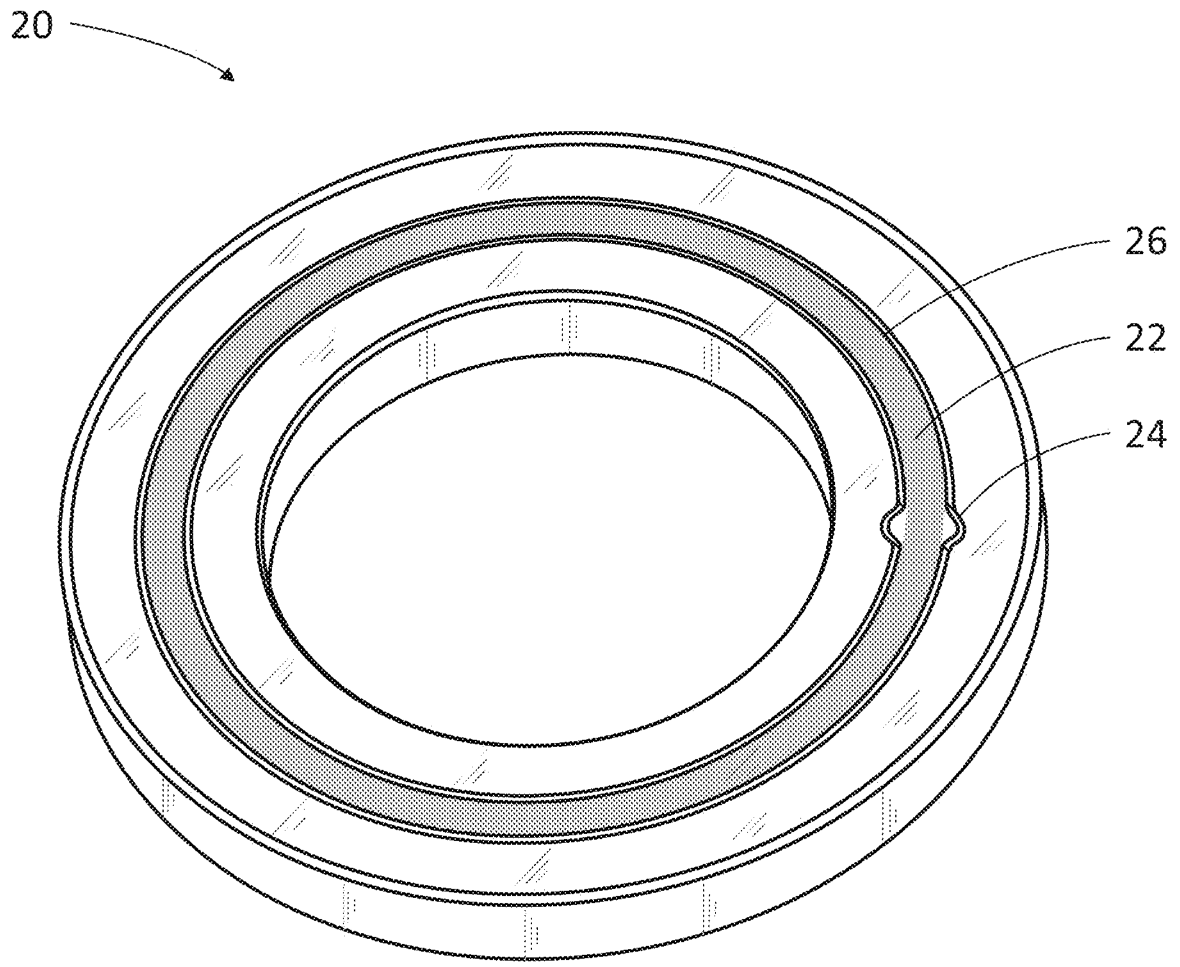
FIG. 1 depicts a schematic diagram showing an O-ring vacuum sealing structure in the existing technology.

Hereinafter, some embodiments of the present disclosure will be described in detail, examples of which are illustrated in the accompanying drawings. Same or similar reference numerals indicate the same or similar elements or elements having the same or similar functions throughout. The embodiments described below by referring to the drawings are illustrative, and are intended to illustrate the embodiments of the present disclosure, but not to be construed as limitations to the present disclosure.

In the description of the present disclosure, it should be understood that the terms like “lateral”, “thickness”, “up”, “down”, “top”, “bottom”, “inside”, and “outside”, indicate the orientation or position relationship based on what is shown in the drawings, and are only for the convenience of describing the present disclosure and simplifying the description, rather than indicating or implying that the device or component referred to must have a specific orientation, be constructed and operated in a specific orientation. And thus, those terms shall not be understood as a limitation to the present disclosure. In addition, the terms “first” and “second” are only illustrative, and it is not intended to be interpreted as indicating or implying the relative importance or implicitly indicating the number of indicated technical features. Thus, the features defined as “first”, “second” and so on may explicitly or implicitly include one or more of the features referred to. In the description of the present disclosure, unless otherwise specified, “plurality” means two or more.

In the description of the present disclosure, it should be noted that unless otherwise specified and limited, the terms “mount”, and “connection” should be broadly understood. For example, the connection can be a fixed connection, a detachable connection, or an integrated connection, or can be a mechanical connection, or electric connection or a communication connection. And the connection can be direct connection, can also be indirect connection through an intermediate media, and can be connection inside two elements or interaction of two elements. The specific meanings of the above terms in the present disclosure can be understood in specific situations, by those having ordinary skills in the art.

In the present disclosure, unless otherwise specified and limited, the first feature “above” or “below” the second feature may include direct contact between the first and second features, or may include that the first and second features are not in direct contact but connect through another feature between them.

The following description provides various embodiments or examples for implementation of different structures of the present disclosure. In order to illustrate the present disclosure, components and arrangements of specific examples are described below. It is noted that they are only examples and are not intended to limit the present disclosure. In addition, the present disclosure may repeat reference numerals and/or reference letters across different examples, and this repetition is for the purpose of simplicity and clarity, and does not itself indicate the relationship between the various embodiments and/or configurations discussed.

In the description of this specification, description with reference to the term “embodiment” or the like means that a specific feature, structure, material or characteristics described in connection with the embodiment or example is included in at least one embodiment or example of the present disclosure. In this specification, the schematic expressions of the above terms do not necessarily refer to the same embodiment or example. Moreover, the specific features, structures, materials or characteristics described may be combined in any one or more embodiments or examples in a suitable manner.

In the semiconductor industry, O-ring vacuum sealing structure is primarily used in high vacuum apparatus in the fields like etch, photolithography, physical vapor deposition (PVD), chemical vapor deposition (CVD) and atomic layer deposition (ALD). As shown in FIG. 1, an O-ring vacuum sealing structure in the existing technology generally provides an O-ring groove 22 and a venting slot 24 in a vacuum sealing assembly 20. The O-ring groove 22 is configured to accommodate an O-ring 26 with its sizes matching those of the O-ring groove. The venting slot 24 is configured to exhaust the trapped air in the O-ring groove 22 after the O-ring 26 is squeezed. The O-ring 26 expands towards the side wall of the O-ring groove 22 after being squeezed, however, a section of the O-ring 26 adjacent to the venting slot 24 is not fully confined by the O-ring groove 22, so the section can freely expand laterally, resulting in that the rate of compression of the section of the O-ring abutting the venting slot 24 is smaller than that of other sections of the O-ring directly abutting against the side walls of the dovetail groove or the square groove. As a result, the required rate of compression (about 16%) of the O-ring cannot be achieved, which affects the sealing effect. In addition, the removal of the O-ring vacuum sealing structure in the existing technology sometimes requires a special tool, such as an O-ring pick tool. In such a case, one end of the O-ring pick tool will be inserted into the venting slot 24 to pick out the O-ring. Although the O-ring pick tool for removing the O-ring seal is typically made of nylon material, when the sealing surface is made of material with less rigidity (such as aluminum alloy), this tool will scratch the sealing surface, and it is also easy to scratch the O-ring during the removal of the O-ring. In view of this, an O-ring vacuum sealing structure and a vacuum apparatus are provided in some non-limiting embodiments of the present disclosure.

Figure 2:
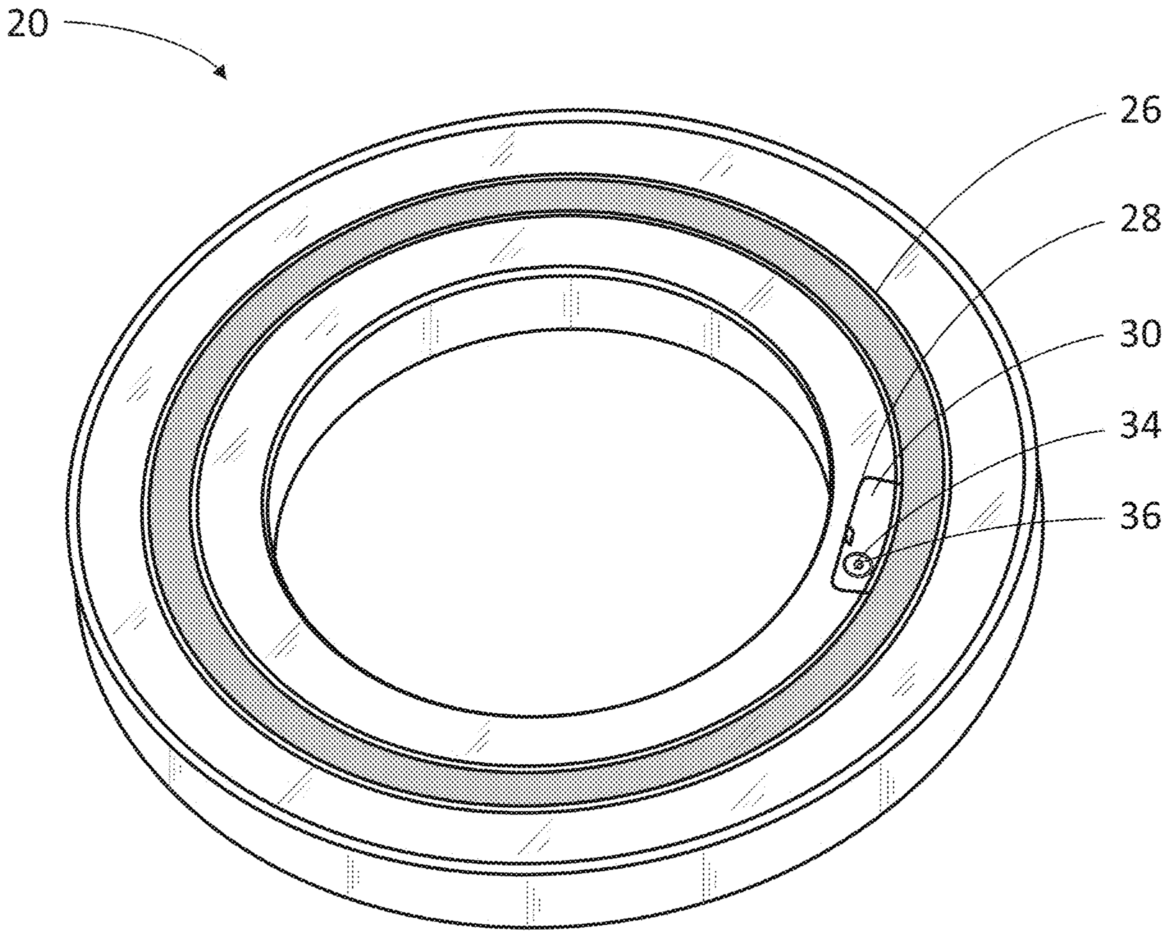
FIG. 2 depicts a schematic diagram showing an O-ring vacuum sealing structure according to non-limiting embodiments of the present disclosure.
Figure 3:
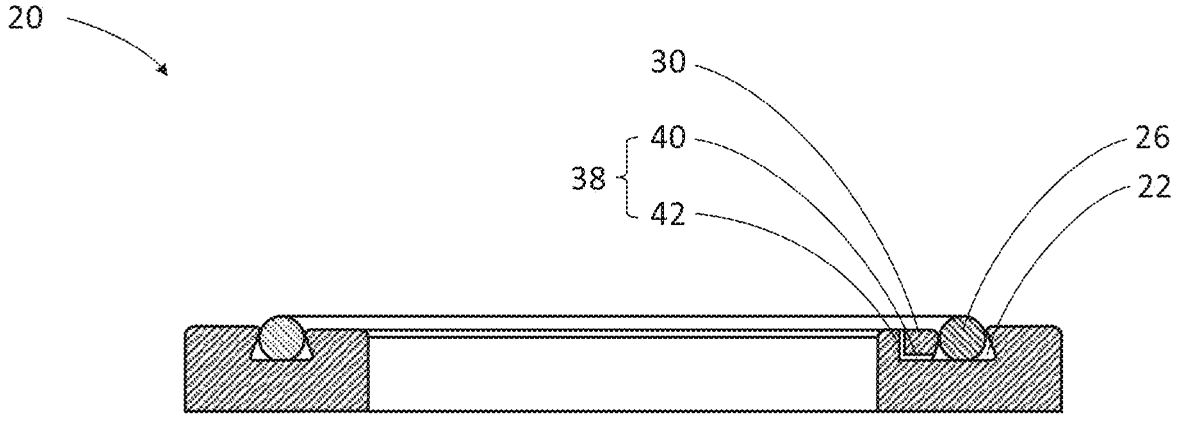
FIG. 3 depicts a sectional view showing an O-ring vacuum sealing structure according to non-limiting embodiments of the present disclosure.
Figure 4:
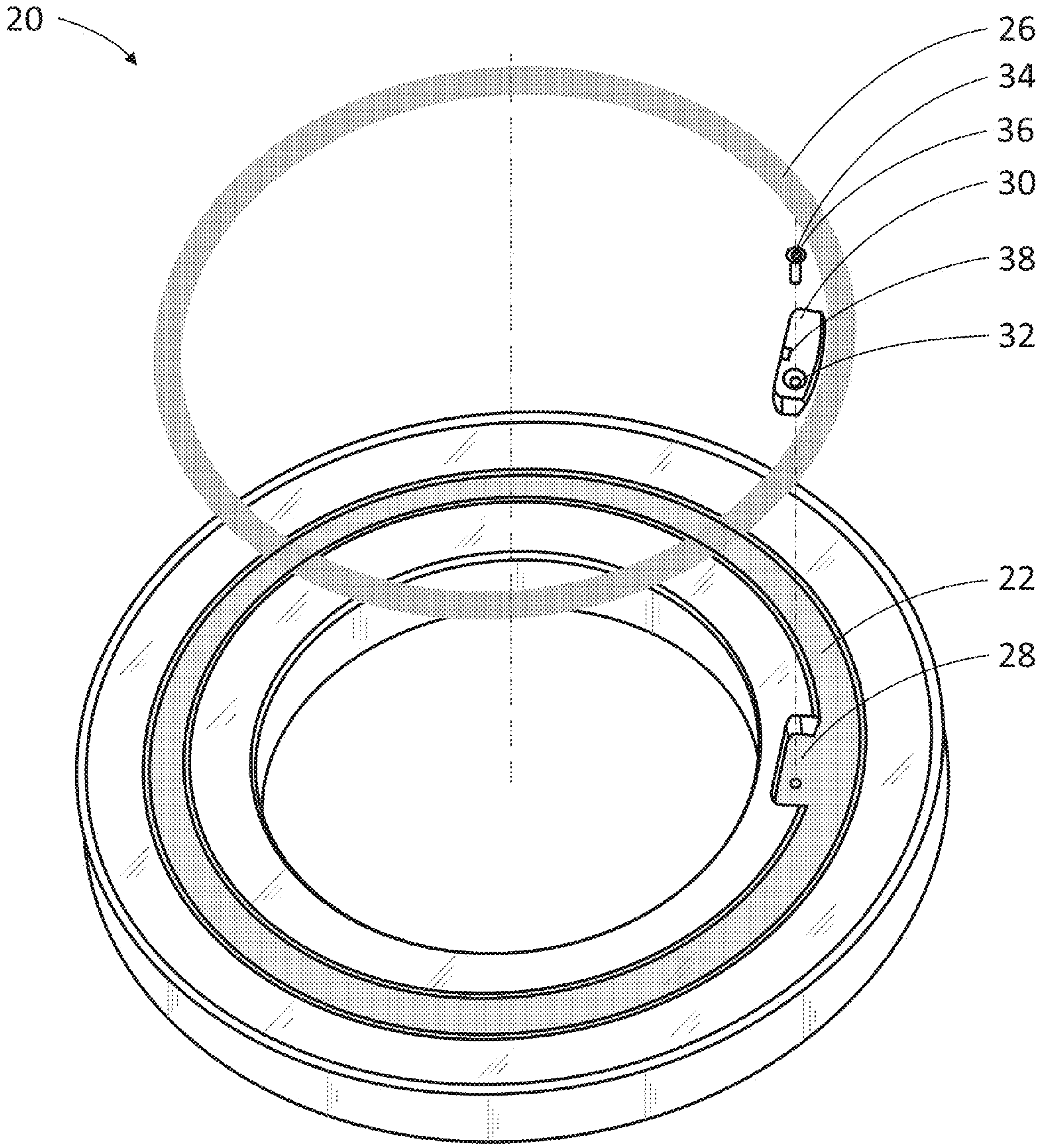
FIG. 4 depicts an exploded schematic view showing an O-ring vacuum sealing structure according to non-limiting embodiments of the present disclosure.

As shown in FIGS. 2-4, in some non-limiting embodiments of the present disclosure, the O-ring vacuum sealing structure includes an vacuum sealing assembly 20 and an O-ring 26. The vacuum sealing assembly 20 has an O-ring groove 22. The O-ring 26 is installed within the O-ring groove 22. The O-ring vacuum sealing structure further includes an O-ring retainer housing 28 and an O-ring retainer 30. The O-ring retainer housing 28 is formed within the vacuum sealing assembly 20 and connected on either side of the O-ring groove 22. The O-ring retainer 30 is installed within the O-ring retainer housing 28 and abuts the O-ring 26. In an implementation, the shape of the O-ring retainer housing 28 mates with the shape of the O-ring retainer 30. During the installation of the O-ring 26, the O-ring retainer 30 is first placed within the O-ring retainer housing 28, such that the vacuum sealing assembly 20 and the O-ring retainer 30 form a complete O-ring groove 22. Then, the O-ring 26 is placed to conform to the contour of the O-ring groove 22. When the O-ring 26 is subjected to a mechanical squeeze, the O-ring 26 is deformed to abut against the inner side wall, the outer side wall, the lower bottom surface of the O-ring groove 22, and the bottom surface of the squeezing member. The inner side wall and the outer side wall of the O-ring groove 22 constrain and maintain the O-ring 26 in position. Both the lower bottom surface of the O-ring groove 22 and the bottom surface of the squeezing member are sealing surfaces. During the removal of the O-ring 26, the O-ring retainer 30 is removed from the O-ring retainer housing 28. After the O-ring retainer 30 is removed, the O-ring 26 is free from the constrain of the O-ring retainer 30. At this point, the O-ring 26 can be removed directly and manually without any tools.

It should be noted that the matching of the shape of the O-ring retainer housing 28 with the shape of the O-ring retainer 30 indicates that the inner contour shape of the O-ring retainer housing 28 is the same as or close to the outer contour shape of the O-ring retainer 30, and the depth of the O-ring retainer housing 28 is the same as or close to the thickness of the O-ring retainer 30. In an implementation, the thickness (height) of the O-ring retainer 30 can be designed to be smaller, for example, 0.1-1.0 mm smaller than the depth of the O-ring retainer housing 28, so as to ensure that during pump down, the O-ring retainer 30 does not make contact with any other components except the O-ring, and only the vacuum sealing assembly 20 contacts the other component to compress the O-ring 26 to achieve the sealing.

In this non-limiting embodiment, as shown in FIGS. 2-4, the O-ring retainer housing 28 is at the inner side (i.e., the vacuum side) of the O-ring groove 22 instead of a venting slot 24 used in the existing technology that would otherwise be there. It is clear that, the O-ring retainer housing 28 can also be at the outside the O-ring groove 22, i.e., the atmospheric pressure side. Also, the O-ring retainer housings 28 can also be located at both inside and outside the O-ring groove 22, that is, two O-ring retainer housings 28 are positioned at the left and right side of the O-ring groove 22. In practical application, the specific positions of the O-ring retainer housings 28 can be adaptively set according to the practical requirements, and the number of the O-ring retainer housings 28 can also be adaptively adjusted according to the practical requirements. The non-limiting embodiment of the O-ring retainer housing(s) 28 above is illustrated by way of example merely, and the present disclosure is not limited thereto.

It should be noted that when the space inside (i.e., the vacuum side) of the O-ring groove 22 is too limited to install the O-ring retainer housing 28 and the O-ring retainer 30, and the O-ring retainer housing 28 is located outside (i.e., the atmospheric pressure side) of the O-ring groove 22, the O-ring groove 22 still needs to be provided internally with a venting feature like a venting slot 24 or a venting hole that intersects with the O-ring groove 22. In the case where the venting feature is designed as a venting hole, the venting hole may be tilted at an angle instead of being vertical. The venting slot extends to the lower corner of the O-ring groove 22. It is worth noting that the venting groove 24 or venting hole is sized to be very small. There is no need for additional space in the venting slot into which a special O-ring pick tool for removing the O-ring is inserted as in the prior art technology, such that the venting slot 24 or the venting hole will not affect the rate of compression and sealing effectiveness of the O-ring 26. The arrangement of the O-ring retainer housing 28 at the outer side (i.e., atmospheric pressure side) of the O-ring groove 22 also facilitates the removal of the O-ring.

Through this technical scheme, the integrity of the O-ring groove 22 is ensured, such that the O-ring groove 22 confines the side walls of the O-ring 26. As a result, the predetermined rate of compression can be achieved when the O-ring is squeezed/pressed, and better sealing can be achieved. In addition, it is unnecessary to use special tools, such as an O-ring pick tool, during the removal of the O-ring 26 by means of the scheme as discussed. In the existing technology, an O-ring pick tool is inserted into the venting slot 24 during the removal of the O-ring 26, and the O-ring 26 can only be removed after being lifted from the O-ring groove 22 by an O-ring pick tool. In contrast, according to various non-limiting embodiments of the present disclosure, the O-ring pick tool or the like is eliminated from the removal of the O-ring, such that the accidental scratch resulting from the sealing surface of the vacuum sealing assembly 20 or the O-ring 26 by a special O-ring pick tool during the removal of the O-ring 26 is eliminated. Hence, the vacuum sealing effect for a re-installation of the O-ring 26 and the vacuum sealing assembly is ensured.

In some non-limiting embodiments, the O-ring retainer 30 has a through hole 32 through which a fastener 34 passes to connect the O-ring retainer 30 to the vacuum sealing assembly 20. In a specific application, the through hole 32 is formed in the O-ring retainer 30, such that the fastener 34 can extend through the through hole 32 to integrally connect the O-ring retainer 30 and the vacuum sealing assembly 20. The O-ring 26 is confined and fixed, such that the O-ring groove 22 confines the side walls of the O-ring 26. As a result, the predetermined rate of compression can be achieved when the O-ring is squeezed/pressed, and better sealing can be achieved. In this embodiment, the fastener 34 is provided as one screw or one bolt and at least one fastener is needed. Due to the matching of the shape of the O-ring retainer 30 with the shape of the O-ring retainer housing 28, the O-ring retainer 30 is connected to the vacuum sealing assembly 20 through one fastener 34. Not enough space is left for the O-ring retainer 30 to rotate around the fastener 34, such that the O-ring retainer 30 is firmly connected with the vacuum sealing assembly 20 and not easy to loosen. It is clear that, more fasteners 34 can be adaptively provided according to practical requirements. The non-limiting embodiment of the single fastener described above is illustrated by way of example merely, and the present disclosure is not limited thereto.

It should be noted that the installation of the O-ring retainer 30 into the O-ring retainer housing 28 which matches the O-ring retainer 30 in shape and size is not limited to the use of fastener(s) 34. Another detachable connection method, such as hinge connection, can be employed, in which the O-ring retainer 30 is hinged onto the vacuum sealing assembly 20. In that case, the O-ring retainer 30 can be installed into or removed from the O-ring retainer housing 28 by rotation, thus realizing tool-free removal. In some other non-limiting embodiments, the fastener 34 is provided as a captive screw, such that after the fastener 34 is screwed out of the connecting hole of the vacuum sealing assembly 20 during the removal of the O-ring, the fastener 34 remains connected with the O-ring retainer 30. As a result, the fastener is prevented from falling into the vacuum system during the removal of the O-ring retainer 30, which would otherwise have an adverse impact on the vacuum system.

In some non-limiting embodiments, the through hole 32 has a counter bore, and the head of the fastener 34 is positioned within the countersunk head of the counter bore. The through hole 32 provided has a counter bore, and prevents the head of the fastener 34 from stretching out from the counter bore after the fastener 34 connects the O-ring retainer 30 and the vacuum sealing assembly 20. That is, the top surface of the head of the fastener 34 is lower than the top surface of the vacuum sealing assembly 20 or is aligned with the top surface of the vacuum sealing assembly 20. Hence, the head of the fastener 34 is prevented from extending outward to interfere with the O-ring sealing requirement.

In some non-limiting embodiments, the fastener 34 has a venting hole 36 along the axial direction of the fastener 34. Using this technical scheme, when the fastener 34 is screwed though the O-ring retainer 30 and then into the bottom surface of O-ring retainer housing 28, the air trapped in the threaded hole at the bottom of O-ring retainer housing 28 can be exhausted by the venting hole 36, which facilitates better vacuum pumping.

In some non-limiting embodiments, the O-ring retainer 30 is provided with a venting path 38 which joins the top and bottom of the O-ring groove 22. By arranging the venting path 38 in the O-ring retainer 30, when the O-ring 26 is mechanically squeezed, the air in the O-ring groove 22 can be squeezed out through both the venting path 38 and the venting slot 24, which not only speed up the exhaust of the gas in the O-ring groove 22, but also facilitates the complete exhaust of the trapped air. Thus, residue air within the O-ring groove 22 is exhausted after sufficient pumping, which would otherwise adversely affecting the achievable vacuum.

Figure 5:
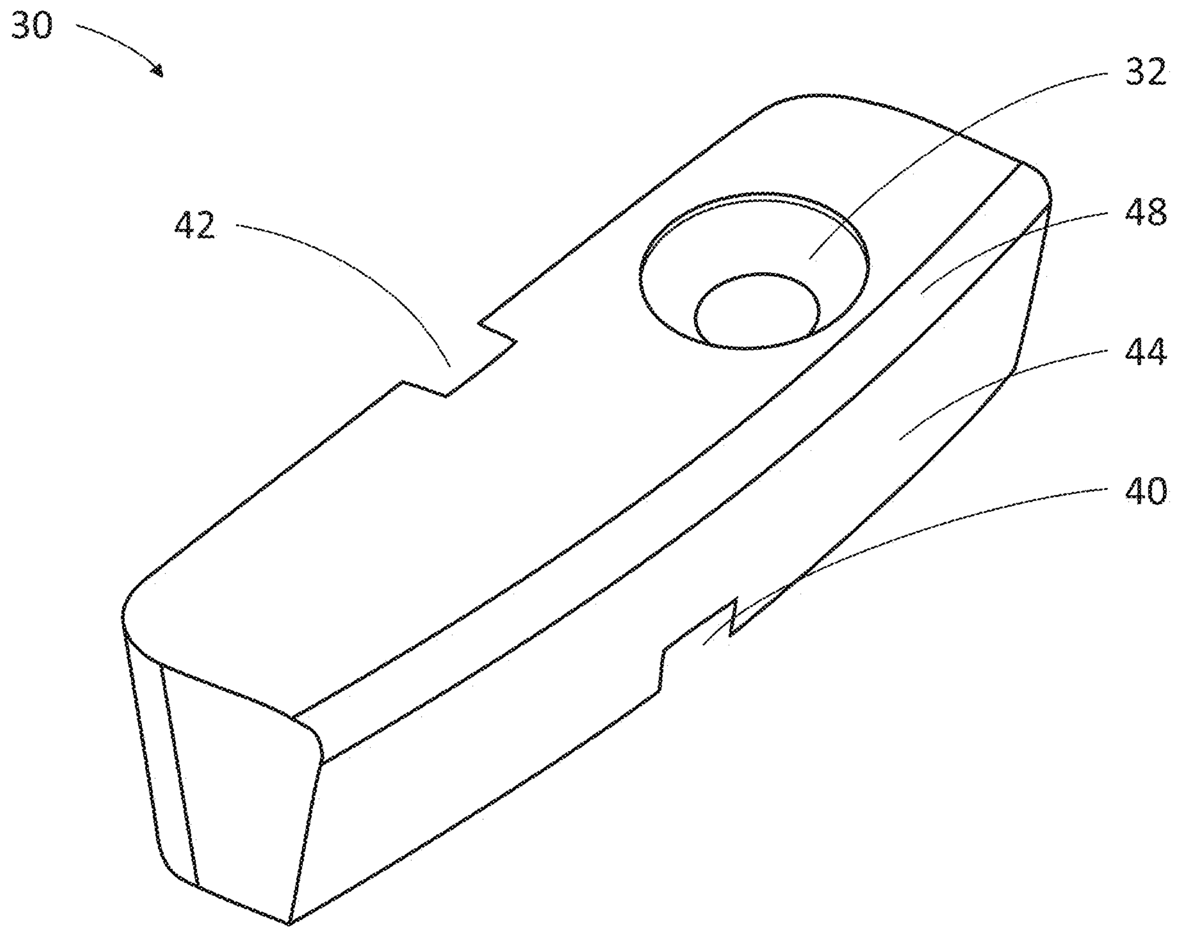
FIG. 5 depicts a schematic diagram showing an O-ring retainer according to non-limiting embodiments of the present disclosure.
Figure 6:
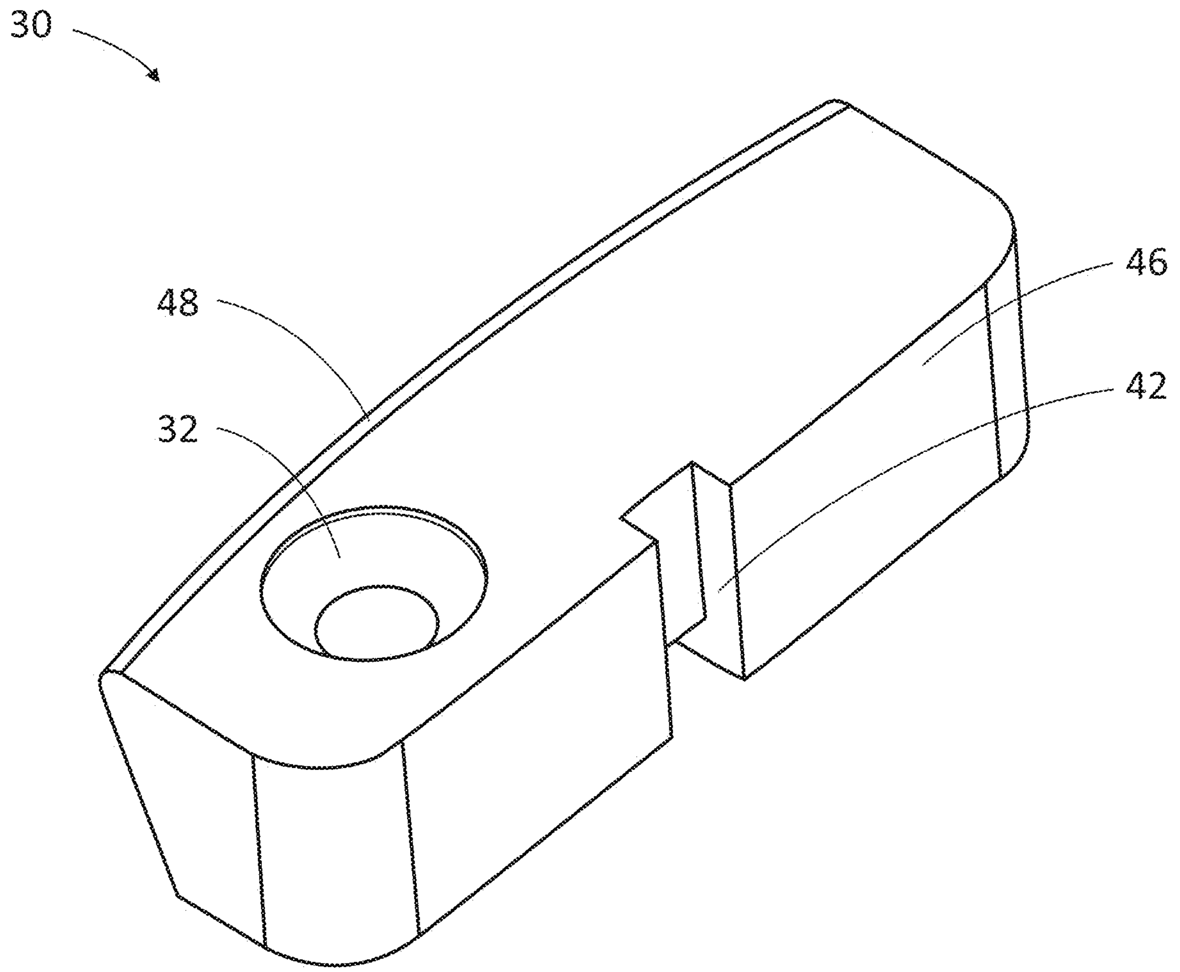
FIG. 6 depicts a schematic diagram showing another view of the O-ring retainer according to non-limiting embodiments of the present disclosure.

In some non-limiting embodiments, the cross section of the venting path 38 is L-shaped, as shown in FIG. 5 and FIG. 6. The venting path 38 is designed to be L-shaped, which facilitates convenient machining of the venting path on two adjacent surfaces of the O-ring retainer 30 and minimizes manufacturing difficulty. Specifically, the L-shaped venting path 38 includes a first path of trapped air 40 and a second path of trapped air 42 which are connected. The O-ring retainer 30 includes a first side surface 44 and a second side surface 46. The first path of trapped air 40 is positioned on a bottom surface of the O-ring retainer 30. The second path of trapped air 42 is positioned on the second side surface 46 of the O-ring retainer 30. The second side surface 46 is the surface of the O-ring retainer 30 distal to the O-ring groove 22, and is adjacent to the bottom surface of the O-ring retainer 30. Through this arrangement of the first and second paths of trapped air, when the O-ring 26 is mechanically squeezed, the trapped air in the O-ring groove 22 is discharged through the first path of trapped air 40 and the second path of trapped air 42 successively.

As shown in FIGS. 5-6, in some non-limiting embodiments, the joint at which the top surface of the O-ring retainer 30 and the first side surface 44 of the O-ring retainer 30 meet, is a chamfered and curved surface 48, and by doing so, the joint is rounded, and the edge of the O-ring retainer 30 is prevented from scratching the O-ring 26 during the installation of the O-ring 26 into the O-ring groove 22, and scratching would otherwise have an adverse impact on the sealing effect.

In some non-limiting embodiments, the first side surface 44 discussed above abuts against the O-ring 26, and the first side surface 44 is an arc surface, or curved surface. The first side surface 44 is designed as an arc surface, such that after the O-ring retainer 30 is installed on the vacuum sealing assembly 20, the first side surface 44 conforms with the inner side wall of the O-ring groove 22, thus forming the O-ring groove 22. As a result, a better sealing effect is achieved when the O-ring 26 is embedded in the O-ring groove 22.

In some non-limiting embodiments, the height at the inner side of the O-ring groove 22 is less than that at the outer side of the O-ring groove 22. In particular, the height at the inner side (i.e., the vacuum side) of the O-ring groove 22 is 0.2-1.0 mm lower than that at the outer side (i.e., the atmospheric pressure side) of the O-ring groove 22. That is, the top surface of the vacuum sealing assembly 20 is an inclined surface inclined from the outer side to the inner side, or the top surface of the vacuum sealing assembly 20 is comprised of two parallel surfaces with height differences, to ensure that during vacuumizing, the outer side (i.e., the atmospheric pressure side) of the O-ring groove 22 is the contact surface, and a small gap is left at the inner side to facilitate the discharging and vacuumizing of trapped-air, and preventing undesired contact and friction due to vacuum-force induced deflection of the vacuum sealing assembly 20.

In some non-limiting embodiments, the O-ring groove 22 is a dovetail groove or a square groove. The provision of the O-ring groove 22 as a dovetail groove or a square groove, facilitates the installation and removal of the O-ring 26. It should be noted that, when the O-ring groove 22 is provided as a dovetail groove, the first side surface 44 is inclined from top to bottom, that is, the distance between the center of the O-ring groove 22 and the end of the first side surface 44 adjacent to the chamfered and curved surface 48 is smaller than the distance between the center of the O-ring groove 22 and the end of the first side surface 44 distal to the chamfered and curved surface 48, such that the first side surface 44 and the other side wall of the O-ring groove 22 form an O-ring groove 22 with a shape of a dovetail groove.

In some non-limiting embodiments, the vacuum sealing assembly 20 is annular. The annular vacuum sealing assembly 20 facilitates the air flow within the vacuum system through the cavity in the annular vacuum sealing assembly 20. Alternatively, the vacuum sealing assembly can also be in other shapes, such as rectangle, square, etc. In specific applications, the vacuum sealing assembly 20 can also be provided as a flange. The non-limiting embodiments of the vacuum sealing assembly above are illustrated by way of example merely, and the present disclosure is not limited thereto.

According to another non-limiting embodiment, a vacuum apparatus is provided. The vacuum apparatus includes the O-ring vacuum sealing structure as discussed in any of the embodiments above. The O-ring vacuum sealing structure of the vacuum sealing assembly 20 is mounted on the vacuum apparatus through a detachable connection or a fixed connection. The O-ring vacuum sealing structure replaces the relatively wide and large venting slot 24 in the existing technology by embedding the innovative O-ring retainer 30 on the lateral surface of the O-ring groove 22 on the vacuum sealing assembly 20. As such, the integrity of the O-ring groove 22 is ensured. The O-ring groove 22 confines the side walls of the O-ring 26. Hence, when the O-ring 26 is squeezed, the predetermined rate of compression can be achieved for better sealing. A sealed environment is provided for the vacuum cavity of the vacuum apparatus. In addition, the installation and removal of the O-ring 26 can be done without the help of additional special O-ring pick tools, so as to prevent the scratching of the O-ring 26 or the sealing surface of the vacuum sealing assembly 20 by the special O-ring pick tools.

In summary, the O-ring vacuum sealing structure and vacuum apparatus set forth in the present disclosure ensure the integrity of the O-ring groove 22 by providing the O-ring retainer housing 28 on the lateral surface of the O-ring groove 22 on the vacuum sealing assembly 20 and installing the O-ring retainer 30 in the O-ring retainer housing 28. As such, the O-ring groove 22 confines the side walls of the O-ring 26. As a result, the predetermined rate of compression when the O-ring 26 is squeezed is achieved, and a better sealing is thus achieved. In addition, a special O-ring pick tool is not necessary during the removal of the O-ring 26 from the O-ring groove 22. The scratching of the O-ring 26 or the sealing surface of the vacuum sealing assembly 20 by the special O-ring pick tool during removal of the O-ring 26 would otherwise have an adverse impact on the sealing effect. The O-ring vacuum sealing structure set forth in the present disclosure can be used in high-vacuum apparatus in semiconductor industries such as etch, photolithography, physical vapor deposition (PVD), chemical vapor deposition (CVD), or atomic layer deposition (ALD) to provide a tight sealing environment for thin film deposition and ensure the quality of films in high-vacuum chambers. It is clear that, the O-ring vacuum sealing structure can also be used in other non-semiconductor industries.

Described above are only some embodiments of the present disclosure. For a person having ordinary skill in the art, several variations and improvements can be made without departing from the scope of the present disclosure, and these should be regarded as falling within the protection scope of the present disclosure.

What is claimed is:

1. An O-ring vacuum sealing structure, comprising:
a vacuum sealing assembly, and
an O-ring;
wherein, the vacuum sealing assembly has an O-ring groove; the O-ring is arranged within the O-ring groove; and the O-ring vacuum sealing structure further comprises an O-ring retainer housing, and an O-ring retainer; the O-ring retainer housing is formed on either side of the O-ring groove; and the O-ring retainer is removably arranged within the O-ring retainer housing and abuts the O-ring;
wherein the O-ring retainer has a through hole, and a fastener runs through the through hole to connect with the vacuum sealing assembly; and
the fastener has a venting hole along an axial direction of the fastener.

2. The O-ring vacuum sealing structure according to claim 1, wherein the fastener is provided as an anti-loosen screw, and the fastener is flare-mounted on the O-ring retainer.

3. The O-ring vacuum sealing structure according to claim 1, wherein the through hole is a counter bore, and a head of the fastener is positioned within a countersunk head part of the counter bore.

4. The O-ring vacuum sealing structure according to claim 1, wherein the O-ring retainer is provided with a venting path that joins the O-ring groove.

5. The O-ring vacuum sealing structure according to claim 1, wherein a joint at which a top surface and a first side surface of the O-ring retainer meet, is a chamfered and curved surface.

6. The O-ring vacuum sealing structure according to claim 5, wherein the first side surface abuts against the O-ring, and the first side surface is an arc surface.

7. The O-ring vacuum sealing structure according to claim 1, wherein a height at an inner side of the O-ring groove is lower than the height at an outer side of the O-ring groove.

8. A vacuum apparatus comprising the O-ring vacuum sealing structure according to claim 1.

9. An O-ring vacuum sealing structure, comprising:
a vacuum sealing assembly, and
an O-ring;
wherein, the vacuum sealing assembly has an O-ring groove; the O-ring is arranged within the O-ring groove; and the O-ring vacuum sealing structure further comprises an O-ring retainer housing, and an O-ring retainer; the O-ring retainer housing is formed on either side of the O-ring groove; and the O-ring retainer is removably arranged within the O-ring retainer housing and abuts the O-ring;
wherein the O-ring retainer is provided with a venting path that joins the O-ring groove.

10. The O-ring vacuum sealing structure according to claim 9, wherein the O-ring retainer has a through hole, and a fastener runs through the through hole to connect with the vacuum sealing assembly.

11. The O-ring vacuum sealing structure according to claim 10, wherein the fastener is provided as an anti-loosen screw, and the fastener is flare-mounted on the O-ring retainer.

12. The O-ring vacuum sealing structure according to claim 10, wherein the through hole is a counter bore, and a head of the fastener is positioned within a countersunk head part of the counter bore.

13. The O-ring vacuum sealing structure according to claim 10, wherein the fastener has a venting hole along an axial direction of the fastener.

14. The O-ring vacuum sealing structure according to claim 9, wherein a joint at which a top surface and a first side surface of the O-ring retainer meet, is a chamfered and curved surface.

15. The O-ring vacuum sealing structure according to claim 14, wherein the first side surface abuts against the O-ring, and the first side surface is an arc surface.

16. The O-ring vacuum sealing structure according to claim 9, wherein a height at an inner side of the O-ring groove is lower than the height at an outer side of the O-ring groove.

17. A vacuum apparatus comprising the O-ring vacuum sealing structure according to claim 9.

* * * * *